United States

[11] 3,576,537

| [72] | Inventor | Richard H. Ernst |
| | | Foxboro, Mass. |
| [21] | Appl. No. | 781,508 |
| [22] | Filed | Dec. 5, 1968 |
| [45] | Patented | Apr. 27, 1971 |
| [73] | Assignee | Polaroid Corporation |
| | | Cambridge, Mass. |

[54] HAND ID SYSTEM
2 Claims, 6 Drawing Figs.

[52] U.S. Cl. ................................................ 340/149,
33/174
[51] Int. Cl. ............................................... G01b 5/00,
G01d 7/10
[50] Field of Search................................................ 340/149

[56] References Cited
OTHER REFERENCES
BUSINESS WEEK, May 10, 1969 " Machine that takes security in hand", page 151

*Primary Examiner*—Donald J. Yusko
*Attorneys*—Brown and Mikulka and Alvin Isaacs ABSTRACT: A spring-retained bar and pin are hand displaced to encode measurements of the hand. Comparison of the encoded measurements may be made with a coded ID card.

PATENTED APR 27 1971          3,576,537

INVENTOR.
RICHARD H. ERNST
BY
Brown and Mikulka
and
Alvin Isaacs
ATTORNEYS 3,576,537

HAND ID SYSTEM

BACKGROUND OF INVENTION

The use of identification (ID) cards is becoming increasingly more prevalent in our society. Such cards find usage, for example, as means for identifying the bearer by industrial or governmental installations where internal security is of great importance, as a driver's license, and by hotels, restaurants, service stations, department stores, etc., for charging purchases. Other common uses include so-called "courtesy cards" for such purposes as check cashing. These cards typically contain a printed description of the bearer, his photograph, or both, and may also contain other indicia such as a validating signature. One surface of the card may contain embossed matter to make the card adaptable for use with standard stamping devices for recording purchases by the bearer. The card may also contain hole punches, e.g., the so-called Hollerith hole-punched card for use with known devices to record use by and/or identify the bearer. Where the card contains no photograph or other identifying matter, the card is more subject to misuse by unauthorized persons e.g., if lost or stolen. Where the card contains his photograph, obviously the chance of misuse is lessened. However, a photo ID card is still subject to forgery by amateurs and professionals alike. For example, the photograph may be skillfully removed and a new photograph substituted. Moreover, with the aid of makeup it is frequently possible for a malfeasor to alter his features to resemble the photo so that misuse of the card goes undetected.

The foregoing problems have long been recognized by those skilled in the art. In the case of ID cards containing a photograph of the bearer (so-called photo ID cards), various "tamperproof" systems have heretofore been devised to prevent or to minimize change of tampering with the card. In the case of cards containing no photograph, but containing his signature, systems are also heretofore known for detecting tampering with the signature.

The present invention is directed to a novel system for preventing misuse of the foregoing types of cards, which system greatly minimizes the chances of forgery and/or unauthorized use of lost or stolen cards.

SUMMARY OF INVENTION

Recent anthropological studies of the human hand indicate that the length and breadth dimensions are among those with the least statistical correlation.

According to the present invention, these dimensions are employed as an identifying factor to validate or otherwise authenticate ID cards including credit cards, and the like.

The present invention contemplates a system wherein the hand measurements of a person to whom a card is to be issued are predetermined and a hole punch or other coding means is employed to contain this information on the card. Upon presentation of the card at a checking station, means may readily be provided for checking the hand measurements of the person presenting the card and comparing these measurements with the coded matter on the card, thereby validating or denying the authenticity of the presentor.

Figure 1:
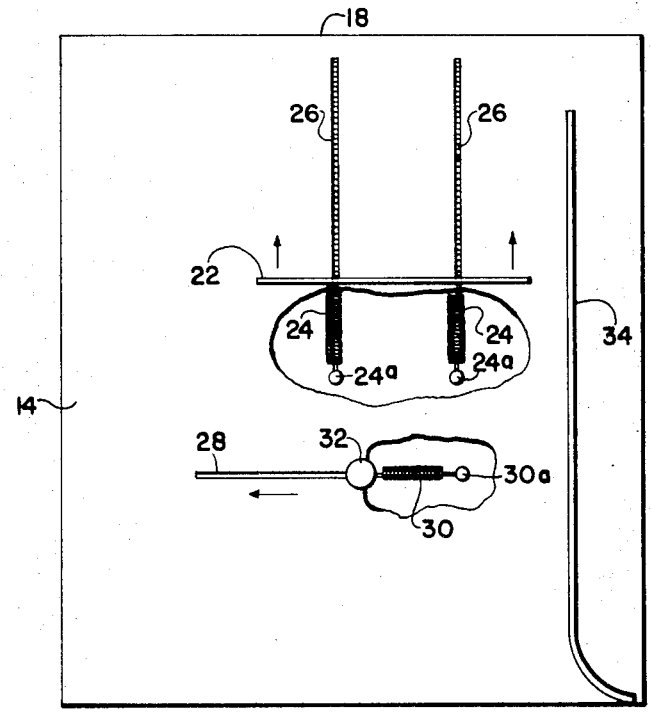
FIG. 1 is a partially schematic plan view of a device for measuring the hand, with a section broken away to show the internal spring action.

As was mentioned previously, this invention relates to ID cards, including so-called credit cards, and the like, and more particularly to a novel system for validating or authenticating such cards when presented.

A primary object of this invention is to provide a novel system for determining forgery, counterfeiting and/or misuse by unauthorized persons of lost or stolen cards.

Another object is to provide a system for measuring the length and width dimensions of the hand of the bearer of the card, translating this information into a coded designation, and supplying this coded designation to the card.

Still another object is to provide an ID card including means for determining the hand measurements of the bearer.

Other objects of the invention will in part be obvious and will in part appear hereinafter.

The invention accordingly comprises the several steps and the relation and order of one or more of such steps with respect to each of the others, the product possessing the features, properties and the relation of elements, and the apparatus possessing the construction, combination of elements and arrangements of parts which are exemplified in the following detailed disclosure, and the scope of the application of which will be indicated in the claims.

For a fuller understanding of the nature and objects of the invention, reference should be had to the following detailed description taken in connection with the accompanying drawings.

As was mentioned briefly in the summary, anthropological studies of the human hand conducted in the past 20 years, mostly by the military services, have revealed that the length and breadth dimensions are among those with the least statistical correlation. In other words, a person with a long hand does not necessarily have a broad hand and vice versa. In fact, the correlation coefficient for these two dimensions was found to be below 0.4. This means simply that any two people would be very unlikely to have both the same width and breadth dimensions. Whereas the probability for similarity in one of the dimensions might be, say, 0.20 within certain tolerance limits, the probability that both are nearly the same is extremely small.

The present invention utilizes these principles to provide a system for further identifying the proper bearer of the card or to detect unauthorized usage thereof. According to the present invention, the hand measurements of the person to whom the card is to be issued are taken, and these measurements are translated into some coded designation, e.g., a numeral arrived at by a predetermined code or chart, which is then recorded on the card by suitable conventional techniques, e.g., hole punching, embossing, etc. When the card is presented at a checking station, the hand measurements are again taken and means may be readily adopted for determining whether the hand measurements are identical or not. Useful systems at the checking station include "go—no-go" electronic systems wherein in signaling device such as a light or bell are actuated in response to a signal from the measuring device. Such systems may also be used to open doors, etc. Systems of the foregoing description per se comprise no part of the present invention.

Figure 2:
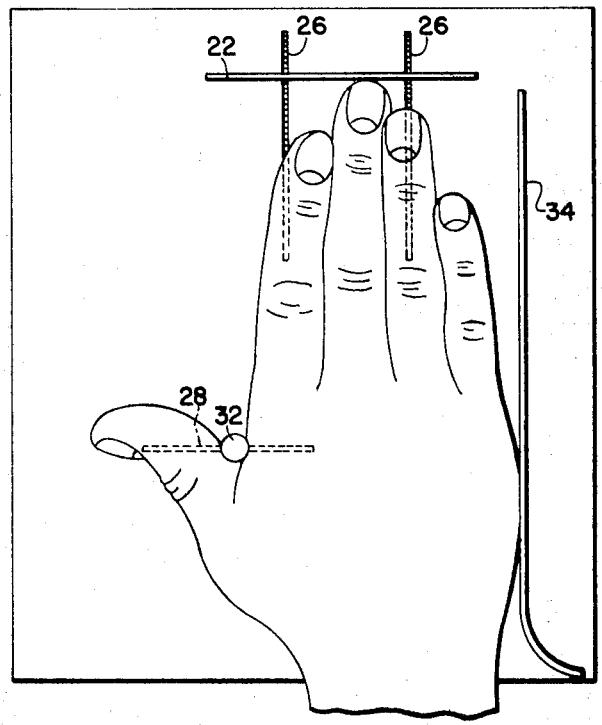
FIG. 2 is a plan view showing the device of FIG. 1 in operation.
Figure 3:
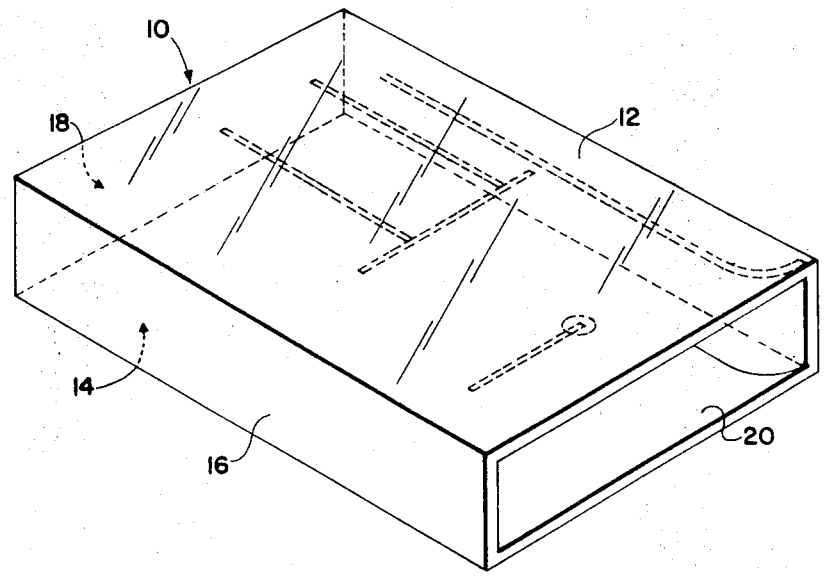
FIG. 3 is a perspective view of a housing for the measuring device of FIG. 1.

One useful device for determining the hand measurements is shown in FIGS. 1—3 of the drawings.

As shown in FIG. 3, the measuring device may take the form of a generally rectangular housing 10 having a top portion 12 which is preferably transparent, bottom 14, sides 16, back 18 and an open front portion 20 for insertion of the hand. Within the housing is located (FIGS. 1 and 2) a length-measuring bar 22 mounted so as to be movable in a direction substantially parallel to the front and back members on notched or recessed tracks 26. Coil or helical springs 24 keeps bar 22 in a normally forward position, i.e., toward the forward end of the track when not in use. Positioned in front of springs 24 is a second or width-measuring track 28 on which a cylindrical or ball-like member 32 is rotatably seated for lateral movement thereon. Track 28 is shown to be generally parallel to bar 22. Spring 30 maintains member 32 towards the right end of the track when not in use. Springs 24 and 30 are affixed to pins 24a and 30a, respectively, as shown. A guide member 34 is also provided to guide the hand within the housing, as will be described hereinafter.

With reference to FIG. 2, the hand to be measured is placed palm down and flat on the bottom member 14 within housing 10 and moved rearward along guide rail 34. The rearward movement of hand causes bar 22 to move rearward on tracks 26 (in the direction of the arrows) and member 32 to slide laterally on track 28 (in the direction of the arrows, as shown in FIG. 1). The rearward movement of the hand is arrested when the thumb crotch reaches member 32. Because of the tension of springs 24 and 30, bar 22 is maintained against the larger of the fingers (usually the middle finger) and member 32 is maintained in the thumb crotch against the first finger, as shown. Suitable means (not shown) are provided for recording the movement of bar 22 and member 32 along their respective tracks. It will be appreciated that the movement of bar 22 records the length of the hand; whereas that of member 32 records the width.

It is contemplated that these measurements may be recorded with an extremely efficient degree of accuracy, say, for example, within one thirty-second of an inch. Since hand dimensions change very little beyond early childhood, these characteristic measurements in turn provide an excellent system for identifying an individual.

As was mentioned previously, these measurements may then be translated into a coded designation to be recorded on the card. One such system which readily suggests itself is to provide a predetermined table or chart, for example, with the length measurement as the abscissa and the width measurement as the ordinate. A coded designation, for example, a numerical designation, may be assigned for each point on the chart where the length and width figures intersect. This numerical designation may be placed on the card by suitable means, e.g., printing, typing, etc. A preferred system utilizes embossing or hole punching, the latter being most preferred since it permits the use of known types of electronic equipment by which a card can be inserted in a reading device to be analyzed. Thus, for example, at an inspection station, means may be provided for inserting the card into an electronic reader while measuring the hand of the presentor of the card. As indicated previously, one skilled in the art could readily design a suitable go-no-go system for comparing the coded hole punch on the card with the hand measurements of the presentor to determine if they are similar or not. It may be desirable for such a device to have a small tolerance for slight differences and such a tolerance, if reasonable, would present no serious impairment to the usefulness of the system.

As heretofore noted, the present invention is adaptable to any type of ID card, including conventional-type credit cards consisting essentially of the name and/or design of the issuer and the name, address and account number of the bearer, which cards may further includes the signature of the bearer; and conventional-type photo ID cards including a photo of the bearer in addition to suitable descriptive indicia pertaining to the issuer and bearer. Accordingly, it is to be expressly understood that the invention is applicable with all such cards.

Figure 4:
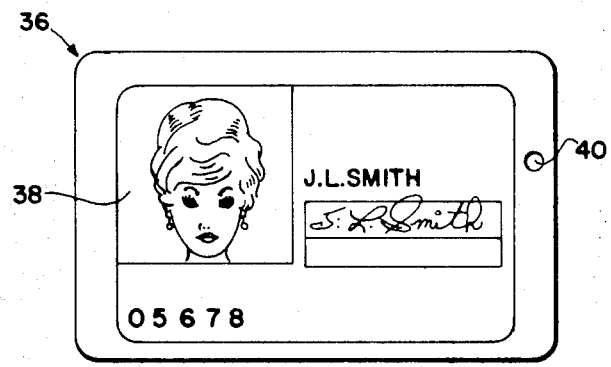
FIG. 4 is a plan view of one form of ID card embodying this invention.

One form of ID card contemplated by the present invention is the photo ID card shown in FIG. 4. As shown therein, card 36 contains a photograph of the bearer 38, suitable other indicia, e.g., name of issuer, signature, name and serial or account number of bearer, etc. This indicia may be supplied by conventional printing and dyeing techniques or it may be a part of the photograph. While the card is shown to contain a single-coded hole punch 40 indicating the hand measurements of the bearer, the use of a plurality of such punches is also contemplated.

As will be appreciated by those skilled in the art, the numerical designation assigned to the individual hand measurement determines the relative position on the card of the hole punch. While a single hole punch 40 is shown, in more sophisticated systems, a plurality of such hole punches are contemplated. In any event, the holes are preferably punched in a nonimage or noninformation containing portion of the card for reasons which should be apparent.

A particularly useful procedure for preparing photo ID cards of this description is by what is known in the photographic art as a diffusion transfer system. In this manner, images may be prepared in black and white or they may be prepared in color.

A black-and-white image may be obtained by developing an exposed photosensitive element comprising a silver halide emulsion containing a developable image by applying thereto a processing composition comprising an aqueous alkaline solution of a silver halide developing agent and a silver halide solvent, reducing exposed silver halide to silver, forming from unreduced silver halide an imagewise distribution of a soluble silver complex, and transferring this imagewise distribution, at least in part, by imbibition, to a superposed silver-receptive stratum where it is reduced to image silver to impart thereto a positive reproduction in silver of the original subject matter. Such photographic procedures are described, for example, in U.S. Pat. Nos. 2,543,181 and 2,647,056 issued to Edwin H. Land.

Color transfer images may be obtained by systems in which a photosensitive element containing at least one exposed silver halide emulsion is developed and as a function thereof an imagewise distribution of mobile and diffusible color image-forming constituents is formed, and this imagewise distribution is transferred at least in part, by imbibition, to a superposed stratum to impart thereto a color transfer image. As examples of such processes, mention may be made of the processes described and claimed in U.S. Pat. No. 2,983,606, issued to Howard G. Rogers, wherein dye developers (dyes which are also silver halide developing agents) are employed as the color-providing material. In such a system, a photosensitive element comprising at least one exposed silver halide emulsion and an associated dye developer is contacted with an aqueous alkaline processing composition, the dye developer develops exposed and developable areas of the emulsion and is in turn oxidized to provide an oxidation product which is of lower mobility in the processing composition than unoxidized dye developer, thereby providing an imagewise distribution of unoxidized and more mobile dye developer in terms of unexposed areas of the emulsion, and transferring, by imbibition, this imagewise distribution of more mobile dye developer to a superposed dyeable stratum to impart thereto a positive dye transfer image. Multicolor reproductions may be obtained by employing a photosensitive element comprising a blue-sensitive, a green-sensitive and a red-sensitive silver halide emulsion, the emulsions having associated therewith, respectively, a yellow, a magenta and a cyan dye developer.

In a preferred system for preparing an ID card by diffusion transfer, e.g., in the manner described above, a data card containing the desired descriptive matter is inserted into the camera so that both the subject and the descriptive matter pertaining to him are simultaneously photographed to provide a transfer print comprising a suitable support having thereon an image-bearing surface containing an image of the subject at one portion of the surface thereof and the descriptive matter at another portion thereof. This print may, if desired, be provided with a substantially transparent protective overlay, e.g., a cellulose derivative such as cellulose acetate butyrate, cellulose triacetate, etc. laminated or otherwise affixed to the surface thereof, or the print, with or without the protective overlay, may be inserted into a suitable envelope or pouch, of which at least the surface overlying the print is substantially transparent to reveal the print contained therein. The envelope or pouch may, for example, be made of a transparent synthetic film conventionally known as "rigid vinyl" or "semirigid vinyl," e.g. polyvinyl chloride or blends or copolymers of polyvinyl chloride and polyvinyl acetate, a polyester film such as polymerized polyethylene glycol ester, etc. The inner surface of the pouch or envelope may be laminated to the print (or, where the print has a protective overlay, as heretofore mentioned, then it may be laminated to the overlay), as a security feature. Various additives for providing a "security lamination" may also be employed.

The ID cards of the preferred system, as mentioned above, may be readily prepared with apparatus commercially available as the Polaroid ID-2 Land Identification System.

Figure 5:
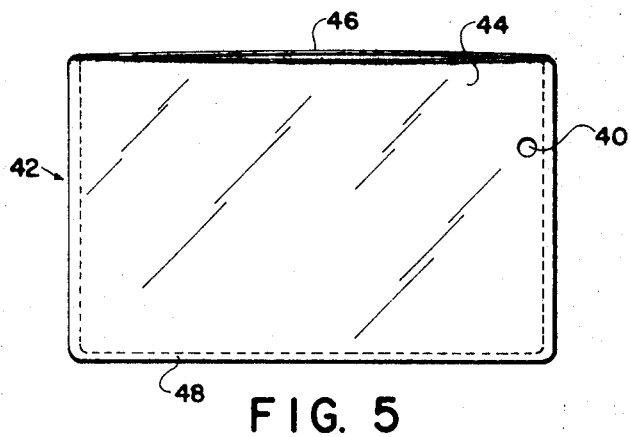
FIG. 5 is a plan view of a pouch for containing an ID card.
Figure 6:
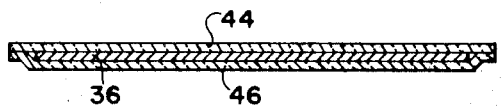
FIG. 6 is a sectional view showing an ID card within the pouch of FIG. 5.

As was mentioned previously, ID cards to which this invention is applicable may be contained in a suitable pouch or envelope. FIG. 5 shows a typical pouch of this description 42 as having a transparent front member 44 and a rear member 46 which may be transparent or opaque, the respective members being sealed together along a portion of periphery 48, leaving an open portion for insertion of the card. In the shown embodiment, the front and back members are sealed together along the three sides shown in dotted lines, the top peripheral area being unsealed to permit insertion of the card. Following insertion, this unsealed area may be sealed by conventional means, e.g., heat- or pressure-sensitive adhesives, to securely encase the card. Such a sealed card is shown in the sectional view of FIG. 6.

Where a hole punching system is employed to record the coded hand measurements, e.g., a Hollerith punch, it will be appreciated that the punch 40 must be made through the front and back sections of the pouch, as shown in FIG. 5. Since the pouch is, of necessity, at least of slightly larger dimensions than the card, it will be apparent that, in embodiments employing a pouch, the hole punch need not be made through the card itself. Where embossing is employed to provide the coded designation, it will be equally apparent that this embossing must be on the pouch. Where other forms of recording this information, such as printing or dyeing techniques, are employed, it will also be appreciated that this information may either be included on the pouch or on the card itself.

By way of recapitulation, the present invention utilizes the individual characteristic of hand measurement to supply an identifying feature to ID cards, which may be the sole individual identifying characteristic or it may be employed in conjunction with other individual characteristics, e.g., photograph, signature, etc. Because there is very little predictable correlation between length and width measurements, this individual characteristic makes it mathematically most unlikely that a malfeasor or person other than the proper bearer would have the same measurements. The hand measurement identifying system has certain other advantages over a photograph alone. Whereas a person's appearance can change significantly, for example, by change of color of hair, balding, wearing eyeglasses or hats, significant changes in weight, etc. so that he or she no longer resembles the photographic likeness, the hand measurements have been found to change very little, if any, after adulthood. Conversely, a malfeasor could, by means of makeup, alter his countenance to resemble the photograph; but it is mathematically extremely unlikely that he could have the same hand measurements.

While the individual hand measurement is not as precise a means of identification as a fingerprint, it is sufficiently precise to be quite adaptable for validating procedures at a checking station and in this sense is of more use than a fingerprint which would require specially trained people and cumbersome techniques for comparison purposes.

Since certain changes may be made in the above product, process and apparatus without departing from the scope of the invention herein involved, it is intended that all matter contained in the above description or shown in the accompanying drawing shall be interpreted as illustrative and not in a limiting sense.

I claim:

1. A process for validating or authenticating an ID card to be presented at an inspection station comprising the steps of measuring a hand of the intended bearer to whom said card is to be issued; translating said measurement into a predetermined coded designation; containing said designation on said card; causing the user of said card to present it at an inspection station; measuring the hand of the presentor of said card at said inspection station; and comparing said respective measurements to determine whether they are the same or different.

2. A process as defined in claim 1 wherein said coded designation is supplied to said card in the form of at least one hole punch, said designation determining the relative position on said card of said hole punch.